(12) United States Patent
Cardwell, III et al.

(10) Patent No.: US 6,584,655 B1
(45) Date of Patent: *Jul. 1, 2003

(54) HIGHLY COMPLIANT AND HIGHLY REPEATABLE RETENTION MECHANISM FOR ATTACHING AND QUICKLY RELEASING COMPONENTS

(75) Inventors: Walter Wilcox Cardwell, III, Austin, TX (US); Stephen Andrew Stickel, Columbus, IN (US); An Tran, Austin, TX (US); Richard P. Manahan, Lake Elmo, MN (US); Scott R. Stone, Somerset, WI (US); David C. Munkwitz, Eau Claire, WI (US)

(73) Assignee: Vermillion Corporation, Austin, TX (US)

( * ) Notice: Subject to any disclaimer, the term of this patent is extended or adjusted under 35 U.S.C. 154(b) by 89 days.

This patent is subject to a terminal disclaimer.

(21) Appl. No.: 09/947,729

(22) Filed: Sep. 6, 2001

Related U.S. Application Data

(63) Continuation-in-part of application No. 09/602,902, filed on Jun. 23, 2000, now Pat. No. 6,374,468.

(51) Int. Cl.7 .......................... A44B 13/02; A44B 17/00
(52) U.S. Cl. .............................. 24/597; 24/324; 24/662; 24/905
(58) Field of Search ...................... 24/597, 662, 265 R, 24/265 BC, 310, 3.13, 598.4, 600.9; 114/217

(56) References Cited

U.S. PATENT DOCUMENTS

| | | | | |
|---|---|---|---|---|
| 1,917,852 A | * | 7/1933 | Prez | 24/662 |
| 3,392,729 A | * | 7/1968 | Lenoir | 24/3.13 |
| 3,551,963 A | * | 1/1971 | Mosher, Jr. et al. | 24/297 |
| 3,561,074 A | * | 2/1971 | Mosher, Jr. et al. | 24/662 |
| 3,979,802 A | * | 9/1976 | Bongartz et al. | 24/662 |
| 4,304,403 A | * | 12/1981 | Wilson | 24/310 |
| 4,599,767 A | | 7/1986 | Kasai | |
| 4,742,605 A | | 5/1988 | Ritacco | |
| 5,127,137 A | * | 7/1992 | Krauss | 24/265 R |
| 5,146,657 A | * | 9/1992 | Frano | 24/265 H |
| 5,502,878 A | * | 4/1996 | Anscher | 24/265 H |
| 5,548,875 A | | 8/1996 | Hart et al. | |
| 5,566,428 A | | 10/1996 | Takahashi | |
| 5,769,681 A | | 6/1998 | Greenwood, Sr. et al. | |
| 6,374,468 B1 | * | 4/2002 | Cardwell, III et al. | 24/297 |

* cited by examiner

Primary Examiner—Victor Sakran
(74) Attorney, Agent, or Firm—Brian F. Russell; Bracewell & Patterson, L.L.P.

(57) ABSTRACT

A retention mechanism has a base and a snap ring that are mounted to two components. The snap ring has a hole for attaching a first component. A conical element with a rounded knob protrudes from the snap ring. The base is cylindrical and has a cap with a rounded face and a conical opening that tapers to a cylindrical hole. Both the knob and the base are slit for greater compliance. After the base and snap ring are mounted to their respective components, the snap ring may be removably connected to the base by inserting its knob into the conical opening in the base. The complementary shapes of the snap ring and base allow for significant axial and angular misalignment. The slits allow the snap ring and base to elastically deform. The snap ring and base are disengaged by pulling the snap ring away from the base.

11 Claims, 4 Drawing Sheets

HIGHLY COMPLIANT AND HIGHLY REPEATABLE RETENTION MECHANISM FOR ATTACHING AND QUICKLY RELEASING COMPONENTS

This patent application is a continuation-in-part of patent application Ser. No. 09/602,902, filed Jun. 23, 2000, now U.S. Pat. No. 6,374,468 and entitled, "Highly Compliant Retention Mechanism for Attaching and Quickly Releasing Components."

BACKGROUND OF THE INVENTION

1. Technical Field

The present invention relates in general to an improved retention mechanism, and in particular to an improved mechanism for releasably joining components. Still more particularly, the present invention relates to a highly compliant and highly repeatable retention mechanism for attaching and quickly releasing components.

2. Description of the Related Art

Retention devices or mechanism for releasably joining two or more components are common and quite varied in the prior art. For example, one type of swivel snap hook device typically comprises a hook member attached to a first object, and an eye member attached to a second object. The hook member is then rotatably connected to the eye member with a separate retaining member. This common design requires three or more parts that are required to interlock, thereby increasing the number of steps and the time required to assemble and disassemble the components. U.S. Pat. No. 4,599,767 simplifies this common design to only two components, but the hook and eye members are permanently joined to each other, and one of the members uses a clip for third component attachment.

An improved swivel snap hook device is described in U.S. Pat. No. 5,548,875. This device is designed to release upon the application of a selected force by breaking a shear pin to unlatch a safety snap. Although a reservoir in the safety snap contains replacement shear pins, reconstructing the device with each deployment is cumbersome. Finally, a safety release mechanism disclosed in U.S. Pat. No. 4,742,605, also describes a device that can be readily separated into two pieces. Unfortunately, this design requires numerous complicated interworking parts to achieve the same result. Thus, an improved retention mechanism for attaching, quickly releasing, and, optionally, reattaching components is desirable. Such a device that could perform such functions in an environment requiring high repeatability would be particularly desirable.

SUMMARY OF THE INVENTION

A two-piece retention mechanism has a base and a snap ring that are individually mounted to two separate components that a user desires to releasably join. The snap ring has a round body with a hole for attaching the first component thereto. A cone-like element with a rounded knob protrudes from the snap ring body. The base has a cylindrical body for mounting to the second component. The body of the base has a cap with a rounded face and a conical opening that tapers down to a cylindrical hole. Both the rounded knob of the snap ring and the inner body of the base are slit for greater compliance therebetween.

After the base and snap ring are mounted to their respective components, the snap ring may be removably connected to the base by inserting its rounded knob into the opening in the base. The complementary shapes of the snap ring and base allow for significant axial and angular misalignment. The snap ring and base elastically deform about their respective slits and emit an audible "snap" during this sequence. To disengage the snap ring from the base, the user simply pulls the snap ring away from base to overcome the retention forces. Again the slits in the elements allow them to elastically deform during the process.

Accordingly, it is an object of the present invention to provide an improved retention mechanism.

It is an additional object of the present invention to provide an improved mechanism for releasably joining components.

Still another object of the present invention is to provide a highly compliant retention mechanism for attaching and quickly releasing components in an environment that requires high repeatability.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF AN ILLUSTRATIVE EMBODIMENT

Figure 1:
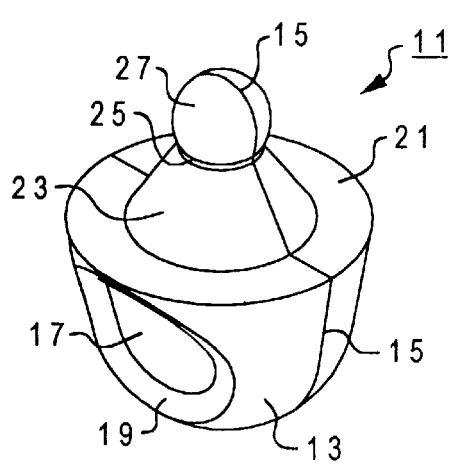
FIG. 1 is a top isometric view of a first embodiment of a snap ring constructed in accordance with the invention.
Figure 2:
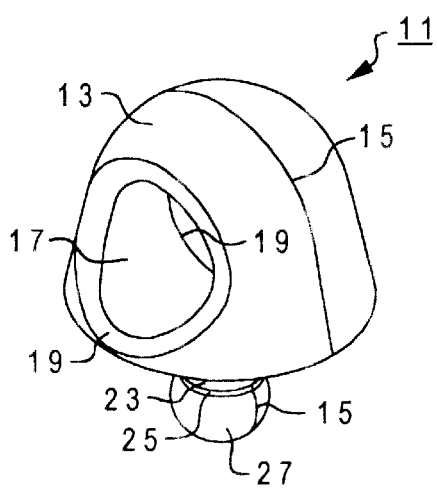
FIG. 2 is a bottom isometric view of the snap ring of FIG. 1.

Referring to FIGS. 1 and 2, a first embodiment of a snap ring 11 constructed in accordance with the invention is shown. Snap ring 11 has a generally rounded or semi-spherical lower body 13 that is bisected by a small ridge 15. Ridge 15 is provided for manufacturing purposes and extends completely around the exterior of snap ring 11. Snap ring 11 is symmetrical about ridge 15 and about a plane (not shown) that perpendicularly bisects ridge 15 and snap ring 11. Lower body 13 has a large body attachment feature comprising, in the embodiment shown, an opening or hole 17 that extends completely through lower body 13 from one side to an opposite side. Lower body 13 also has an annular concave taper 19 on each of its sides that is provided between the exterior of lower body 13 and hole 17. Tapers 19 are beveled to facilitate entry into hole 17 by an object being attached to snap ring 11 (e.g., a key ring, lanyard, etc.).

In this embodiment, lower body 13 terminates with a flat upper surface 21 having a circular perimeter. A generally cone-like or frustoconical element 23 centrally protrudes from the flat upper surface 21 of lower body 13 such that the axis (not shown) of frustoconical element 23 is substantially perpendicular to surface 21. Frustoconical element 23 tapers down to a slender, annular neck 25 having a minor diameter from which a spherical tip 27 extends at the distal end thereof. Spherical tip 27 has a diameter that is larger than the minor diameter of annular neck 25, but smaller than the major diameter of frustoconical element 23 where it intersects surface 21. However, the major diameter of frustoconical element 23 need not be larger than the diameter of spherical tip 27. In the preferred embodiment, all of the components of snap ring 11 are formed as a single, integrated unit from a rigid yet somewhat elastic material such as plastic.

Figure 3:
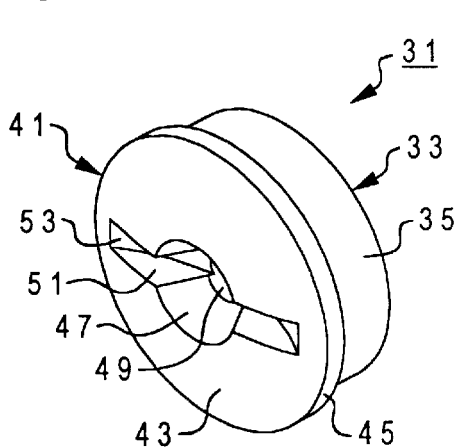
FIG. 3 is a top isometric view of a base constructed in accordance with the invention for use in conjunction with the snap ring of FIG. 1.
Figure 4:
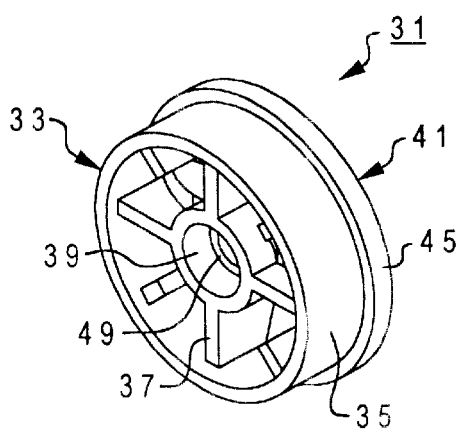
FIG. 4 is a bottom isometric view of the base of FIG. 3.
Figure 5:
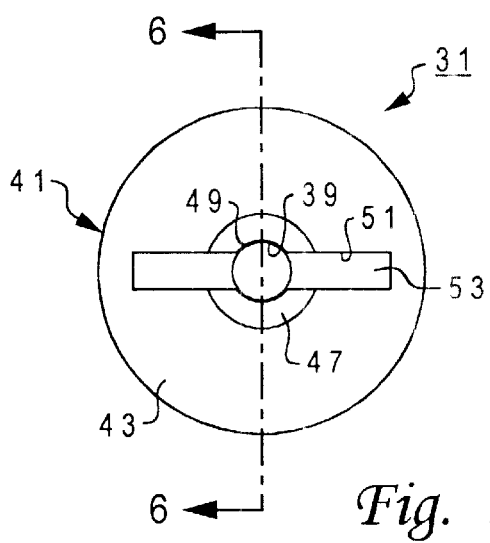
FIG. 5 is a top plan view of the base of FIG. 3.

Referring now to FIGS. 3–5, a base 31 constructed in accordance with the invention is shown. Base 31 has a hollow, cylindrical lower body 33 having an exterior surface 35 that may be provided with common attachment means such as smooth, ribbed, or threaded surfaces for attaching the base 31 to another object (e.g., a dispenser, telephone, or other portable electronic device or tool, etc.). Alternatively, base 31 may be integrally formed with the other object. The interior of lower body 33 is reinforced with a rib-like structure 37 (FIG. 4) for structural strength. A small, shallow, cylindrical hole 39 is defined at the center of the rib-like structure 37 such that the axes (not shown) of hole 39 and cylindrical lower body 33 are coincident.

A cylindrical, disk-like cap 41 is mounted to the upper end of lower body 33. Ideally, base 31 and all of its components, including lower body 33 and cap 41, are integrally formed as a single unit from a rigid yet somewhat elastic material such as plastic. Cap 41 has a slightly convex face 43 (FIG. 3) and a circular outer edge 45. The diameter of outer edge 45 is slightly greater than a diameter of cylindrical lower body 33 such that outer edge 45 appears as a flange for base 31. Like lower body 33, cap 41 has a central opening 47 that is coincident with hole 39 (FIGS. 3–5). Preferably, opening 47 is a concave, cone-shaped recess that tapers toward the small hole 39. A narrow throat 49 is located between opening 47 and hole 39 for interfacing their differing diameters. Throat 49 has a diameter that is slightly larger than a diameter of neck 25 on snap ring 11. Cap 41 is also provided with an elongated, generally rectangular drive slot 51 that straddles and bisects opening 47. In the event that surface 35 of lower body 33 is threaded, slot 51 is provided to facilitate rotation of base 31 with a screwdriver or the like relative to the object to which it is attached. In the embodiment shown, slot 51 has an inverted, arcuate lower surface 53 that accepts the round edge of a coin in order to rotate base 31.

Figure 6:
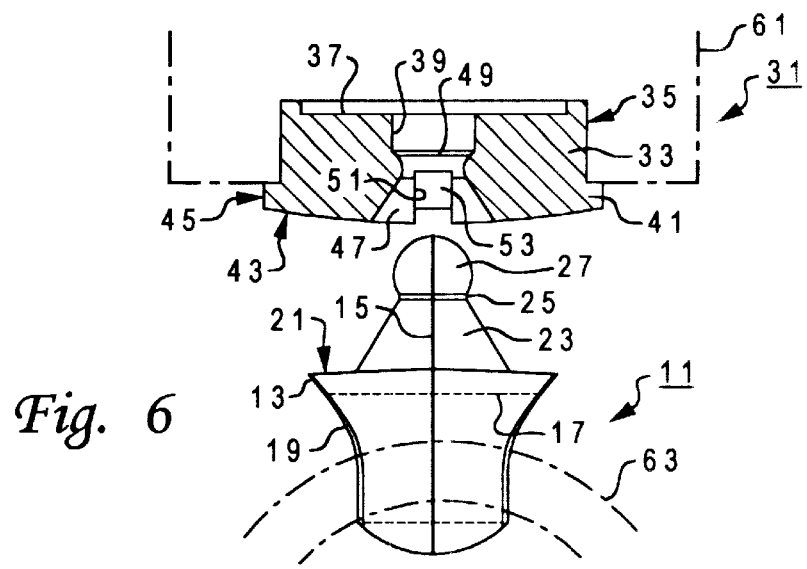
FIG. 6 is side elevational view of the base of FIG. 3 sectioned along the line 5—5 of FIG. 5, and the snap ring of FIG. 1 in profile prior to insertion into the base.

Referring now to FIG. 6, in operation base 31 is mounted to or integrally formed with a first object 61 (shown in phantom). As stated previously, there are a number of common ways base 31 can be attached to object 61. If the exterior surface 35 of base 31 is smooth or ribbed, base 31 is simply inserted into object 61 and retained by interference or frictional forces. For additional retention force, base 31 may be bonded to object 61. If surface 35 and object 61 are threaded, a screwdriver or coin may be inserted into slot 51 and twisted in order to apply torque to base 31 for installation in object 61. Snap ring 11 is mounted to a second object 63 (also shown in phantom) such as a key ring or lanyard in a conventional manner.

Figure 7:
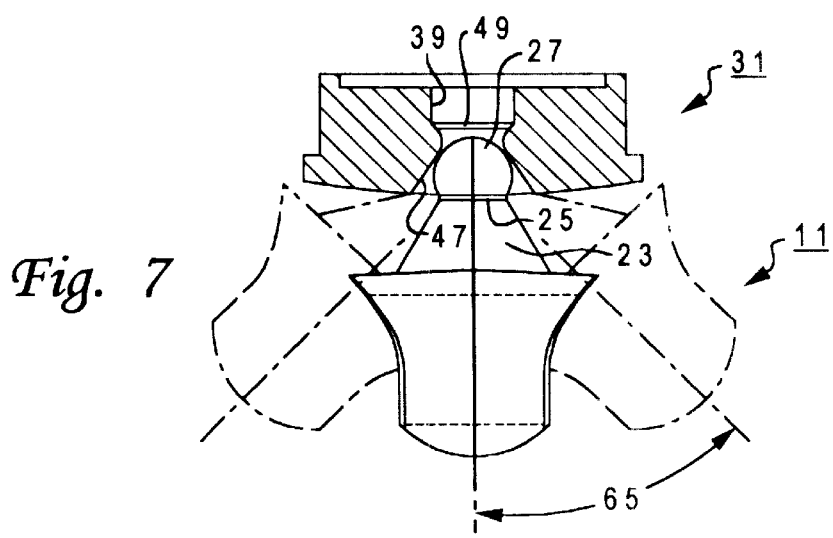
FIG. 7 is side elevational view of the base and snap ring of FIG. 6 at a first point of insertion contact, and illustrates a range of permissible insertion angles in phantom.

As shown in FIG. 7, snap ring 11 may be removably connected to base 31 by first locating the spherical tip 27 of snap ring 11 generally near and/or inside the conical opening 47 in base 31. As shown by the phantomed shapes to the left and right of snap ring 31, the complementary shapes of snap ring 11 and base 31 allow for a significant degree of axial misregistration and angular misalignment therebetween prior to engagement between the components. In the embodiment shown, the axis of snap ring 11 may be misaligned up to an angle 65 (approximately 45 degrees) from the axis of base 31 in any radial direction relative to the axis of base 31. Such compliance is made possible by the major diameter at the mouth of opening 47 (which is larger than the diameter of tip 27), its conically tapered sidewalls, and the spherical exterior of tip 27. Other alternatives, such as cylindrical walls or elements may be used to decrease compliance.

Figure 8:
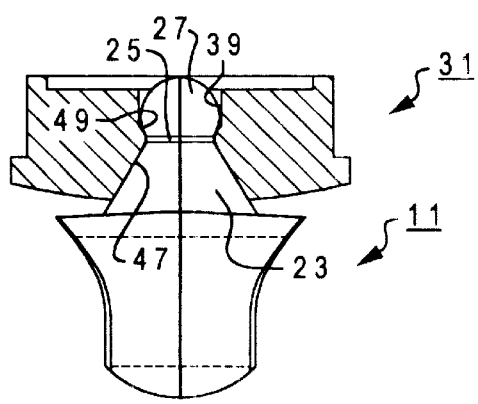
FIG. 8 is side elevational view of the base and snap ring of FIG. 6 after the snap ring is fully inserted into the base.

As tip 27 of snap ring 11 continues to enter opening 47 of base 31, their conical surfaces engage each other to force compliance and eventually axial and angular alignment between the components. In FIG. 7, note that the diameter of tip 27 is larger than the innermost or minor diameters of opening 47 and throat 49. As a result, temporary, elastic deformation is required to join the elements together. As tip 27 passes through opening 47 to throat 49 (FIG. 8), slight elastic deformation of at least one of and, preferably, both tip 27 and base 31 occurs to complete the union. An audible "snap" is typically perceived by the user during this sequence. When snap ring 11 and base 31 are fully engaged, tip 27 is located in hole 39 such that neither body 11 nor any portion of base 31 are deformed, and neck 25 on snap ring 11 substantially registers with throat 49 in base 31. In this fully engaged position, the lack of elastic deformation of the components eliminates creep. In addition, the conical surfaces of frustoconical element 23 and opening 47 abut one another to achieve a snug fit with no stress or deformation. However, in the engaged position (FIG. 8), snap ring 11 is capable of rotating relative to base 31.

To disengage snap ring 11 from base 31, the user simply exerts an axial force on snap ring 11 that is directed away from base 31. When the axial force exceeds the frictional and deformation forces between snap ring 11 and base 31, the components once again elastically deform and emit an audible "snap" as they disengage.

Figure 9:
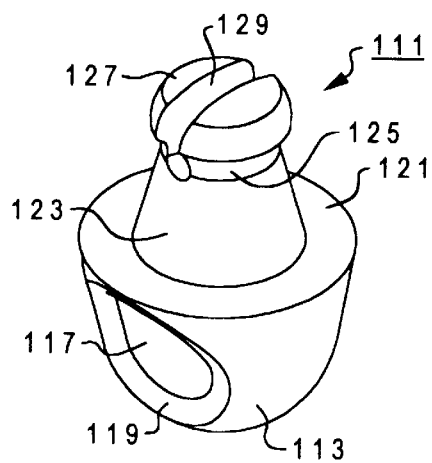
FIG. 9 is a top isometric view of a second embodiment of a snap ring constructed in accordance with the invention.
Figure 10:
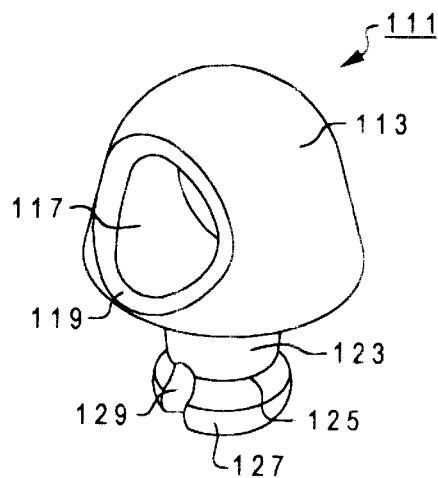
FIG. 10 is a bottom isometric view of the snap ring of FIG. 9.

Referring to FIGS. 9 and 10, a second embodiment of a snap ring 111 constructed in accordance with the invention is shown. Snap ring 111 has a generally rounded or semi-spherical lower body 113 with a large attachment feature comprising, in the embodiment shown, an opening or hole 117 that extends completely through lower body 113 from one side to an opposite side. Lower body 113 also has an annular concave taper 119 on each of its sides that is provided between the exterior of lower body 113 and hole 117. Tapers 119 are beveled to facilitate entry into hole 117 by an object being attached to snap ring 111 (e.g., a key ring, lanyard, etc.).

In this embodiment, lower body 113 terminates with a flat upper surface 121 having a circular perimeter. A generally cone-like or frustoconical element 123 centrally protrudes from the flat upper surface 121 of lower body 113 such that the axis (not shown) of frustoconical element 123 is substantially perpendicular to surface 121. Frustoconical element 123 tapers down to a slender, annular neck 125 having a minor diameter from which a generally flat, circular knob 127 with a convex surface that extends at the distal end thereof. Knob 127 has a radiused or rounded perimeter edge and a diameter that is larger than the minor diameter of annular neck 125, but smaller than the major diameter of frustoconical element 123 where it intersects surface 121. However, the major diameter of frustoconical element 123 need not be larger than the diameter of knob 127.

Snap ring 111 also has a shallow diametrical slit 129 that bisects knob 127 in the same axial direction as hole 117. The proximal portion of slit 129 that extends down into the distal end of frustoconical element 123 is radiused for greater flexibility and to extend the usable life of snap ring 111. In the preferred embodiment, all of the components of snap ring 111 are formed as a single, integrated unit from a rigid yet somewhat elastic material such as Acetal RTP 0800 TFE 5.

Figure 11:
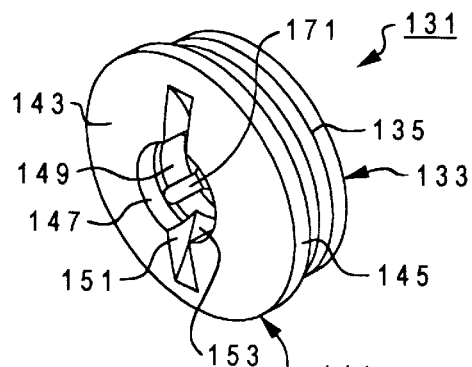
FIG. 11 is a top isometric view of a base constructed in accordance with the invention for use in conjunction with the snap ring of FIG. 9.
Figure 12:
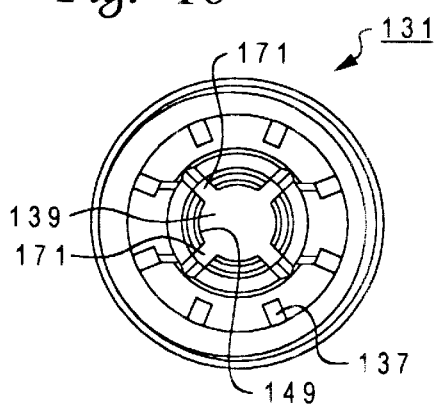
FIG. 12 is a bottom view of the base of FIG. 11.
Figure 13:
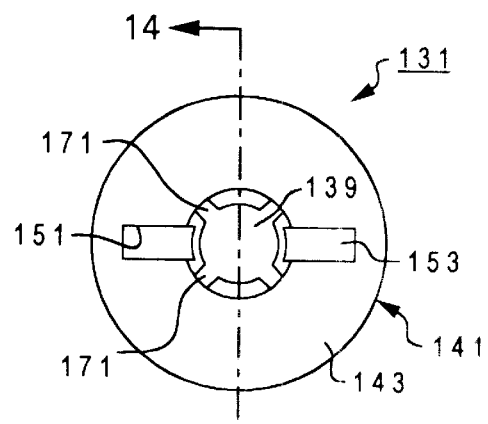
FIG. 13 is a top view of the base of FIG. 11.

Referring now to FIGS. 11–13, a base 131 constructed in accordance with the invention is shown. Base 131 has a hollow, cylindrical lower body 133 having an exterior surface 135 that may be provided with common attachment means such as smooth, ribbed, or threaded surfaces for attaching the base 131 to another object (e.g., a dispenser, telephone, or other portable electronic device or tool, etc.). Alternatively, base 131 may be integrally formed with the other object. The interior of lower body 133 is reinforced with a rib-like structure 137 (FIG. 12) for structural strength. A small, shallow, cylindrical hole 139 is defined at the center of the rib-like structure 137 such that the axes (not shown) of hole 139 and cylindrical lower body 133 are coincident.

Figure 14:
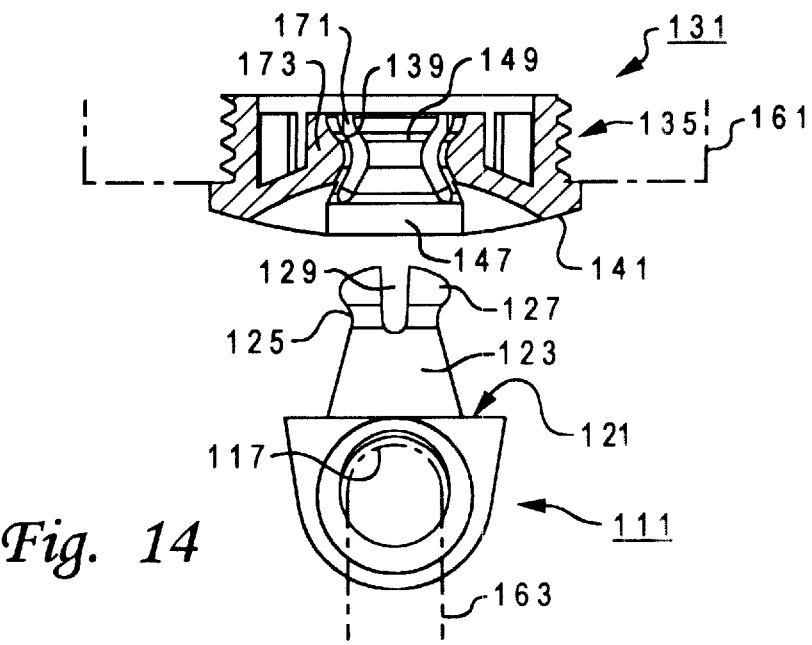
FIG. 14 is side elevational view of the base of FIG. 1 sectioned along the line 14—14 of FIG. 13, and the snap ring of FIG. 9 in side profile prior to insertion into the base.

A cylindrical, disk-like cap 141 is mounted to the upper end of lower body 133. Ideally, base 131 and all of its components, including lower body 133 and cap 141, are integrally formed as a single unit from the same material as snap ring 111. Cap 141 has a slightly convex face 143 (FIG. 11) and a circular outer edge 145. The diameter of outer edge 145 is slightly greater than a diameter of cylindrical lower body 133 such that outer edge 145 appears as a flange for base 131. Like lower body 133, cap 141 has a central opening 147 that is coincident with hole 139 (FIG. 11). Preferably, opening 147 is a conical recess that tapers toward hole 139. A narrow throat 149 is located between opening 147 and hole 139 for interfacing their differing diameters. Throat 149 has a diameter that is slightly larger than a diameter of neck 125 on snap ring 111. Base 131 also has a pair or set of shallow diametrical, orthogonal slits 171 that, in the embodiment shown, divide throat 149 into four fingers or segments 173 that define hole 139. Slits 171 extend from the top of segments 173 (FIG. 14) down to an interface with opening 147 and are radiused at that interface for greater flexibility and to extend the usable life of base 131.

As shown in FIGS. 11 and 13, cap 141 is also provided with an elongated, generally rectangular drive slot 151 that straddles and bisects opening 147. In the event that surface 135 of lower body 133 is threaded, slot 151 is provided to facilitate rotation of base 131 with a screwdriver or the like relative to the object to which it is attached. In the embodiment shown, slot 151 has an inverted, arcuate lower surface 153 that accepts the circular edge of any coin in order to rotate base 131.

Referring again to FIG. 14, in operation base 131 is mounted to or integrally formed with a first object 161 (shown in phantom). As stated previously, there are a number of common ways base 131 can be attached to object 161. If the exterior surface 135 of base 131 is smooth or ribbed, base 131 is simply inserted into object 161 and retained by interference or frictional forces. For additional retention force, base 131 may be bonded to object 161. If surface 135 and object 161 are threaded, a screwdriver or coin may be inserted into slot 151 (FIGS. 11 and 13) and rotated in order to apply torque to base 131 for installation in object 161. Snap ring 111 is mounted to a second object 163 (also shown in phantom) such as a key ring, lanyard, or other item in a conventional manner.

Figure 15:
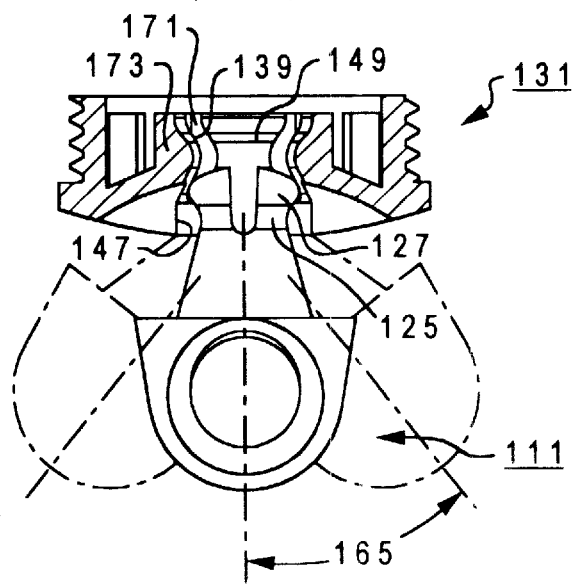
FIG. 15 is side elevational view of the base and snap ring of FIG. 14 at a first point of insertion contact, and illustrates a range of permissible insertion angles in phantom.

As shown in FIG. 15, snap ring 111 may be removably connected to base 131 by first locating knob 127 of snap ring 111 generally near and/or inside opening 147 in base 131. As shown by the phantomed shapes to the left and right of snap ring 111, the complementary shapes of snap ring 111 and base 131 allow for a significant degree of axial misregistration and angular misalignment therebetween prior to engagement between the components. In the embodiment shown, the axis of snap ring 111 may be misaligned up to an angle 165 (approximately 45 degrees) from the axis of base 131 in any radial direction relative to the rotational axis of base 131. Such compliance is made possible by the major diameter at the mouth of opening 147 (which is larger than the diameter of knob 127), its conically tapered sidewalls, and the rounded exterior of knob 127. Other alternatives, such as cylindrical walls or elements may be used to decrease compliance.

Figure 16:
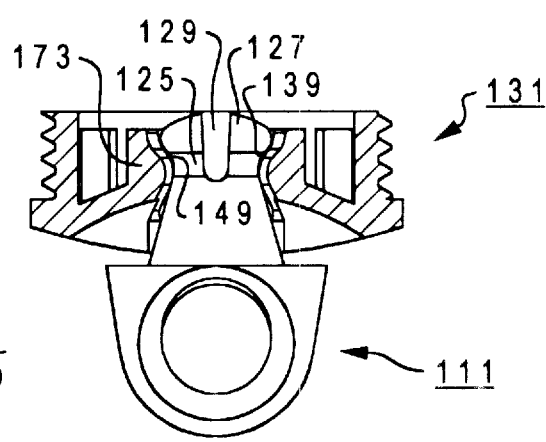
FIG. 16 is side elevational view of the base and snap ring of FIG. 14 alter the snap ring is fully inserted into the base.

As knob 127 of snap ring 111 continues to enter opening 147 of base 131, their surfaces engage each other to force compliance and eventually axial and angular alignment between the components. In FIG. 15, note that the diameter of knob 127 is larger than the innermost or minor diameters of opening 147 and throat 149. As a result, temporary, elastic deformation is required to join the elements together. As knob 127 passes through opening 147 to throat 149 (FIG. 16), slight elastic deformation of at least one of and, preferably, both knob 127 and segments 173 occurs to complete the union. This highly repeatable elastic deformation is made possible by slits 129,171. An audible "snap" is typically perceived by the user during this sequence.

When snap ring 111 and base 131 are fully engaged, knob 127 is located in hole 139 such that neither body 111 nor any portion of base 131 are deformed, and neck 125 on snap ring 111 substantially registers with throat 149 in base 131. In this fully engaged position, the lack of elastic deformation of the components eliminates creep. In addition, the conical surfaces of frustoconical element 123 and opening 147 abut one another to achieve a snug fit with no stress or deformation. However, in the engaged position (FIG. 16), snap ring 111 is capable of rotating relative to base 131.

To disengage snap ring 111 from base 131, the user simply exerts an axial force on snap ring 111 that is directed away from base 131. When the axial force exceeds the frictional and deformation forces between snap ring 111 and base 131, the components once again elastically deform about slits 129, 171 and emit an audible "snap" as they disengage.

The invention has several advantages. The slitted elements of the snap ring and the base allow for highly repeatable insertion and extraction sequences. During testing, the present invention has maintained an extraction force of nine to twelve pounds after 1000+cycles. In the preferred embodiment, this configuration has the unexpected benefit of extending the usable life of the invention by two orders of magnitude over previous designs. The complementary shapes of the snap ring and the base allow for a significant degree of axial misregistration and angular misalignment prior to engagement. This high degree of compliance is made possible by the large diameter at the mouth of the conical opening in the base, and the rounded and conical exteriors of the snap ring. In addition, the tapers to the through-hole in the snap ring are beveled to facilitate entry into the hole. Individually, the snap ring and the base are formed as single, integrated units that allow limited elastic deformation and unlimited rotational movement therebetween.

The exterior of the base may be provided with a variety of attachment surfaces depending on the application, and the slot in the cap of the base permits the base to be easily mounted. The snap ring is adequately retained on the base via frictional and interference forces. The "break away" force required to remove the snap ring from the base may be calibrated for different applications by selecting appropriate materials and dimensions. Finally, an audible, confirmation "snap" is typically perceived by the user during engagement and disengagement of the components.

While the invention has been shown or described in only some of its forms, it should be apparent to those skilled in the art that it is not so limited, but is susceptible to various changes without departing from the scope of the invention.

What is claimed is:

1. A retention mechanism, comprising:
   a body having an attachment feature for securing a first component to the body, a conical element extending from the body, and a knob having a slit on a distal end of the element;
   a base having an attachment feature for securing a second component to the base, a conical opening for receiving the knob and the element of the body, and a slit extending through the opening to define segments of the base; wherein
      the body is adapted to releasably join the first component to the second component via the base by inserting the knob of the body into the opening in the base such that a highly compliant fit is achieved therebetween; and wherein
      the slits in the body and the base provide elastic deformation therebetween and extend the usable life thereof.

2. The retention mechanism of claim 1 wherein the slit in the knob is diametrical.

3. The retention mechanism of claim 1 wherein the slit in the base comprises a pair of diametrical, orthogonal slits that define four segments.

4. The retention mechanism of claim 1 wherein the body and the base each have an axis and are capable of accommodating angular misalignment between their respective axes of up to approximately 45 degrees in any radial direction relative to the axis of the base.

5. The retention mechanism of claim 1, further comprising:
   a neck on the body located between the element and the knob;
   a throat in the opening in the base; and wherein
      when the body is joined to the base, the neck and the throat substantially register such that the knob of the body is located beyond the opening and the throat in the base.

6. The retention mechanism of claim 1 wherein the retention mechanism has a released position wherein the body is separated from the base, a transition phase wherein the knob is inserted into the opening in the base such that at least one of the base and the knob is temporarily and elastically deformed, and an engaged position wherein the body joins the first component to the second component via the base while the body and the base are free of elastic deformation.

7. A retention mechanism, comprising:
   a body having an attachment feature for securing a first component to the body, a conical element extending from the body, and a convex knob on a distal end of the element with a diametrical slit extending therethrough, wherein the element has a minor diameter that is less than a diameter of the knob;
   a base having an attachment feature for securing a second component to the base, a conical opening for receiving the knob and the element of the body, and a pair of diametrical, orthogonal slits extending through the opening to define a set of four segments for securing the knob; wherein
      the retention mechanism has a released position wherein the body is separated from the base, a transition phase wherein the knob is inserted into the opening in the base such that the segments of the base and the knob are temporarily and elastically deformed, and an engaged position wherein the body joins the first component to the second component via the base while the body and the base are free of elastic deformation to avoid creep; and wherein
      the slits in the body and the base provide elastic deformation therebetween and extend the usable life thereof.

8. The retention mechanism of claim 7 wherein the body and the base each have an axis and are capable of accommodating angular misalignment between their respective axes of up to approximately 45 degrees in any radial direction relative to the axis of the base.

9. The retention mechanism of claim 7, further comprising:
   a neck on the body located between the element and the knob and defined at the minor diameter of the element;
   a throat in the opening in the base defined at a minor diameter of the opening; and wherein
      when the body is joined to the base, the neck and the throat substantially register such that the knob is located beyond the opening and the throat.

10. The retention mechanism of claim 7 wherein the opening in the base has a major diameter that is greater than the diameter of the knob, and a minor diameter that is less than the diameter of the knob.

11. The retention mechanism of claim 7 wherein the base has a drive slot for applying torque to the base.

* * * * *

UNITED STATES PATENT AND TRADEMARK OFFICE
CERTIFICATE OF CORRECTION

PATENT NO.     : 6,584,655 B1                                                   Page 1 of 1
DATED          : July 1, 2003
INVENTOR(S)    : Walter Wilcox Cardwell, III et al.

It is certified that error appears in the above-identified patent and that said Letters Patent is hereby corrected as shown below:

Column 2,
Line 65, please replace "FIG.1" with -- FIG. 11 --.

Column 3,
Line 5, please replace the word "alter" with the word -- after --.

Signed and Sealed this

Fourteenth Day of October, 2003

JAMES E. ROGAN
*Director of the United States Patent and Trademark Office*